(12) United States Patent
Kanda et al.

(10) Patent No.: US 8,414,055 B2
(45) Date of Patent: Apr. 9, 2013

(54) VEHICLE SEAT

(75) Inventors: Kenji Kanda, Tokyo (JP); Masaaki Honda, Tokyo (JP); Yosuke Karino, Tokyo (JP)

(73) Assignee: Tachi-S Co., Ltd., Tokyo (JP)

(*) Notice: Subject to any disclaimer, the term of this patent is extended or adjusted under 35 U.S.C. 154(b) by 141 days.

(21) Appl. No.: 12/975,207

(22) Filed: Dec. 21, 2010

(65) Prior Publication Data

US 2012/0153658 A1 Jun. 21, 2012

(51) Int. Cl.
*B60N 2/12* (2006.01)

(52) U.S. Cl.
USPC ............... 296/65.09; 296/65.13; 296/65.18

(58) Field of Classification Search ........... 296/65.01, 296/65.05, 65.08, 65.09, 65.13–65.18, 68.1; 297/313, 327, 344.1, 344.12–344.15, 344.17
See application file for complete search history.

(56) References Cited

U.S. PATENT DOCUMENTS

| | | | | |
|---|---|---|---|---|
| 4,765,582 A * | 8/1988 | Babbs | | 248/394 |
| 5,882,061 A * | 3/1999 | Guillouet | | 296/65.05 |
| 6,502,798 B1 * | 1/2003 | Frohnhaus et al. | | 248/422 |
| 6,921,058 B2 * | 7/2005 | Becker et al. | | 248/419 |
| 6,966,598 B2 * | 11/2005 | Schmale | | 296/65.08 |
| 7,281,749 B2 * | 10/2007 | Yamada et al. | | 296/65.05 |
| 7,631,939 B2 * | 12/2009 | Wulf et al. | | 297/344.13 |
| 7,654,615 B2 * | 2/2010 | Ventura et al. | | 297/344.15 |
| 7,717,509 B2 * | 5/2010 | Kojima | | 297/216.2 |
| 7,766,427 B2 * | 8/2010 | Kojima et al. | | 297/344.15 |
| 8,128,147 B1 * | 3/2012 | Kanda et al. | | 296/65.05 |
| 8,177,280 B2 * | 5/2012 | Yamada et al. | | 296/65.05 |
| 2009/0152889 A1 * | 6/2009 | Jeong | | 296/65.09 |
| 2010/0148532 A1 * | 6/2010 | Jungert et al. | | 296/65.18 |
| 2010/0253110 A1 * | 10/2010 | Yamada et al. | | 296/65.08 |
| 2012/0153658 A1 * | 6/2012 | Kanda et al. | | 296/65.13 |

FOREIGN PATENT DOCUMENTS

JP 2009286237 A 12/2009

* cited by examiner

*Primary Examiner* — Glenn Dayoan
*Assistant Examiner* — Gregory Blankenship
(74) *Attorney, Agent, or Firm* — Browdy and Neimark, PLLC

(57) ABSTRACT

A vehicle seat, including two links movable for adjustment in height of the seat, is provided with a reinforcing transmission shaft. The reinforcing transmission shaft is rotatably connected between two frame members of seat cushion frame in the seat, while extending through the two links. Further, two pinions are fixed on the respective two end portions of the reinforcing transmission shaft and respectively meshed with two gear portions defined in the respective two links. With such arrangement, in the case of rear-end collision, most of great load applied to the links is transmitted, via the reinforcing transmission shaft, pinions and gear portions, to each of the two frame members, thereby preventing deformation of one of the two links to avoid lowering of the seat or inclination of one side of the seat as found in a rear-end collision case.

5 Claims, 2 Drawing Sheets

VEHICLE SEAT

BACKGROUND OF THE INVENTION

1. Field of the Invention

The present invention relates to a vehicle seat which is provided with a seat height adjustment mechanism or what is generally known as "seat lifter mechanism". In particular, the invention is directed to an improvement of link elements included in such seat lifter mechanism, which is designed to protect the link elements in the case of a rear-end collision.

2. Description of Prior Art

Typically, the seat lifter mechanism includes a pair of front links and a pair of rear links, which such an arrangement that the front links are pivotally connected between the forward underside of a vehicle seat and a floor of vehicle, whereas the rear links are pivotally connected between the rearward underside of the seat and the floor. Vertical synchronized rotation of those four links allows the seat to be adjustably raised and lowered to a desired level or height by means of the associated interlocking mechanisms, parts and control lever, and so forth.

The Japanese Laid-Open Patent Publication No. 2009-286237, or JP 2009-286237 A1 shows the above-stated seat lifter mechanism including two front links and two rear links. According thereto, the two front links are pivotally connected between a forwardly facing portion of seat cushion frame of a vehicle seat and a forwardly facing portion of upper rail of seat slide rail fixed on a floor of vehicle, wherein the upper rail is slidably engaged with a lower rail fixed on the floor. On the other hand, the two rear links are pivotally connected between a rearwardly facing portion of the seat cushion frame and a rearwardly facing portion of the upper rail. A connecting rod is horizontally extended and connected between the two rear links to allow synchronized rotation of both two rear links relative to the axis of the connecting rod in vertical direction. One of the two rear links is formed with a sector gear portion therein. Such sector gear portion is in meshed engagement with a pinion rotatably supported in the seat cushion frame, the pinion being connected to a drive element or a manual operation lever having a brake device incorporated therein. By raising the manual operation lever, the pinion is rotated in normal direction, thereby causing rotation of the sector gear portion, so that both two rear links are rotated upwardly, which in turn causes upward displacement of the seat cushion frame or seat. Reversely, lowering of the manual operation lever causes reverse rotation of the pinion, thus resulting in downward rotation of both two rear links to cause downward displacement of the seat.

In the foregoing conventional seat, as stated above, only one rear link (hereinafter, a first rear link) is provided with the sector gear portion and pivotally connected, via the pinion and brake device, between the seat and floor. But, the other rear link (hereinafter, a second rear link) is not formed as such, but simply pivotally connected between seat and floor. Due to that structure, in the case where a rear-end collision occurs, with a backward great excessive load being applied from a seat occupant under inertia to the seat, the excessive backward load is intensively exerted upon the second rear link, as a result of which, that second rear link is deformed and therefore one lateral side of the seat where the second rear link exists is lowered or inclined downwardly relative to the other lateral side of seat where the first rear link exists. This is because, in the first rear link, the excessive great load is dispersed in the sector gear portion and pinion and thus reduced to avoid deformation of the link, whereas the load is straightly exerted upon the second rear link without being dispersed and reduced, hence deforming the second rear link only. Consequently, in that case, the seating posture of seat occupant becomes unstable, and moreover, both first and second rear links are not smoothly moved in synchronized manner via the connected rod connected therebetween.

SUMMARY OF THE INVENTION

In view of the above-stated drawbacks, it is a primary purpose of the present invention to provide an improved vehicle seat of the type including link elements movable for raising and lowering the seat, which prevents the above-described lowering of the seat or the inclination of one side of the seat in the case of rear-end collision In order to achieve such purpose, in accordance with the present invention, a seat to be mounted in a vehicle is basically comprised of:

- a seat cushion frame including a first frame member and a second frame member;
- a drive pinion rotatably supported in the first frame member of the seat cushion frame, the drive pinion being operatively connected with a drive source provided with the seat;
- a first link element having: an upper portion pivotally connected with the first frame member of the seat cushion frame; and a lower portion pivotally connected with a floor of the vehicle, wherein the upper portion has, defined therein, a sector gear portion which is in meshed engagement with the drive pinion;
- the first link element including a hole and a gear portion;
- a second link element having: an upper portion pivotally connected with the second frame member of the seat cushion frame; and a lower portion pivotally connected with the floor of the vehicle;
- the second link element including a hole and a gear portion;
- a connecting axis element rotatably extended between the first and second frame members of the seat cushion frame;
- the first and second link elements being coupled together by the connecting axis element for synchronized movement;
- a reinforcing transmission shaft having one end portion and another end portion, the reinforcing transmission shaft extending in a parallel relation with the connecting axis element, such that the afore-said one end portion thereof extends through the hole of the first link element and is rotatably connected with the first frame member of the seat cushion frame, whereas the afore-said another end portion thereof extends through the hole of the second link element and is rotatably connected with the second frame member of the seat cushion frame;
- a first pinion fixed to the one end portion of the reinforcing transmission shaft, the first pinion being in meshed engagement with the gear portion of the first link element; and
- a second pinion fixed to the afore-said another end portion of the reinforcing transmission shaft, the second pinion being in meshed engagement with the gear portion of the second link element.

Preferably, the hole of the first link element may be so formed as to extend in a direction vertically of the seat, and the gear portion of the first link element is formed in one edge portion of that hole, thus defining an inwardly-toothed gear portion vertically in the first link element.

As one preferred aspect, the above-described seat may be constructed as follows: The first link element comprises a first front link and a first rear link. The first front link is pivotally connected with a forwardly facing portion of the first frame member, whereas the first rear link is pivotally connected with a rearwardly facing portion of the first frame member. The second link element comprises a second front link and a second rear link, The second front link is pivotally connected with a forwardly facing portion of said second frame member, whereas the second rear link is pivotally connected with a rearwardly facing portion of the first frame member. The afore-said sector gear portion is formed in an upper portion of the first rear link, wherein the upper portion corresponds to the upper portion of the first link element, The afore-said hole and gear portion associated with the first link element are formed in the first rear link, while the hole and gear portion associated with the second link element are formed in the second rear link. The afore-said reinforcing transmission shaft is arranged between the first and second rear links in such a manner that such one and another end portions of the reinforcing transmission shaft extend through the respective holes of the first and second rear links, with the first and second pinions being in meshed engagement with the gear portions respectively of the first and second rear links.

Other various features and advantages will become apparent from reading of the description, hereinafter, with reference to the accompanied drawings.

DETAILED DESCRIPTION OF PREFERRED EMBODIMENT OF THE INVENTION

Referring to FIGS. 1 to 4, there is illustrated a preferred embodiment of vehicle seat generally designated by (S) in accordance with the present invention, which is provided with a seat lifter mechanism (not designated) for adjustment in height of the seat.

As shown, the seat (S) is basically comprised of a seat cushion frame (CF) and a seat back frame (BF) rotatably connected with the seat cushion frame (CF). Though not shown, it is to be understood that the seat cushion frame (CF) and seat back frame (BF) are each properly upholstered, using a foam padding and a trim cover assembly covering that foam padding, so that the seat cushion frame (CF) is normally upholstered to form a seat cushion, whereas the seat back frame (BF) is normally upholstered to form a seat back, in the present seat (S).

It is to be noted that the wording "forward" or "forwardly" refers to a forward side (FW) facing forwardly of the seat (S), whereas the wording "rearward" or "rearwardly" refers to a rearward side (BW) facing rearwardly of the seat (S).

The seat back frame (BF) is shown to include a pair of side frame members (4A) and (4B). On the other hand, the seat cushion frame (CF) is shown as comprising: a pair of left- and right-side lateral frame members (3A) and (3B); and a forwardly facing cross frame member (3D) fixedly connected between the two forward ends respectively of the two lateral frame members (3A) and (3B).

A seat lifter mechanism (not designated) provided in the seat (S) includes: a pair of left- and right-side front links (5A) and (5B) which are formed in a known manner; and a pair of left- and right-side rear links (6A) and (6B) which form one of principal parts of the present invention. Basically, those four links are arranged between the seat cushion (at CF) and seat slide device (SL) (or a floor of vehicle designated by FL) in a parallel linkage fashion, as found in the art, such that the two front links (5A) (5B) are maintained in a parallel relation with the respective two rear links (6A) (6B), whenever those all four links are pivotally articulated vertically in synchronized way.

In this context, the seat slide device (SL) is used with the seat (S) to allow for adjustment in position of the seat in forward and rearward directions. But, the seat slide device itself may not be used, in which case, all lower end portions of the front and rear links may be directly or indirectly connected to the floor (FL) in an appropriate manner, using a suitable means.

As shown, the seat slide device (SL) typically comprises a pair of left-side upper and lower rails (2A) and (1A) and a pair of right-side upper and lower rails (2B) and (1B). In any of the left and right-side rails, the upper rails (2A, 2B) are slidably engaged with the respective lower rails (1A, 1B) fixed on the floor (FL), as known in the art.

Figure 1:
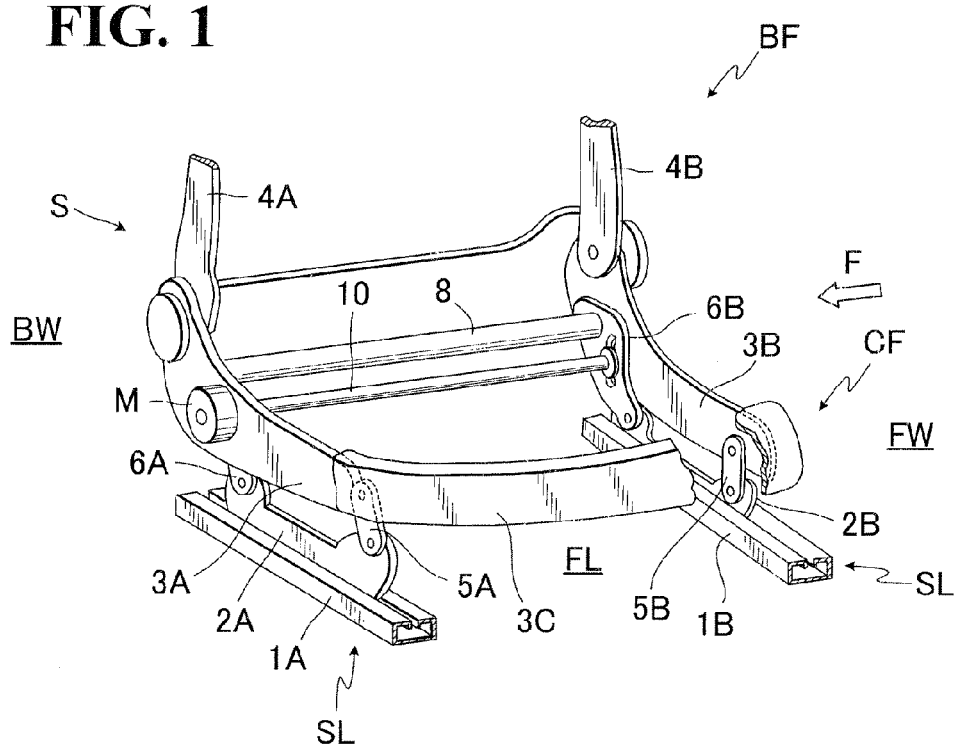
FIG. 1 is a partly broken perspective view showing a seat in accordance with the present invention.

Referring now to FIG. 1, the left-side front link (5A) is at the upper end thereof pivotally connected with a forwardly facing end portion of the left-side lateral frame member (3A) of seat cushion frame (CF), while being at the lower end thereof pivotally connected with a forwardly facing end portion of the left-side upper rail (2A). On the other hand, likewise, the right-side front link (5B) is at the upper end thereof pivotally connected with a forwardly facing end portion of the right-side lateral frame member (3B) of seat cushion frame (CF), while being at the lower end thereof pivotally connected with a forwardly facing end portion of the right-side upper rail (2B)

Figure 2:
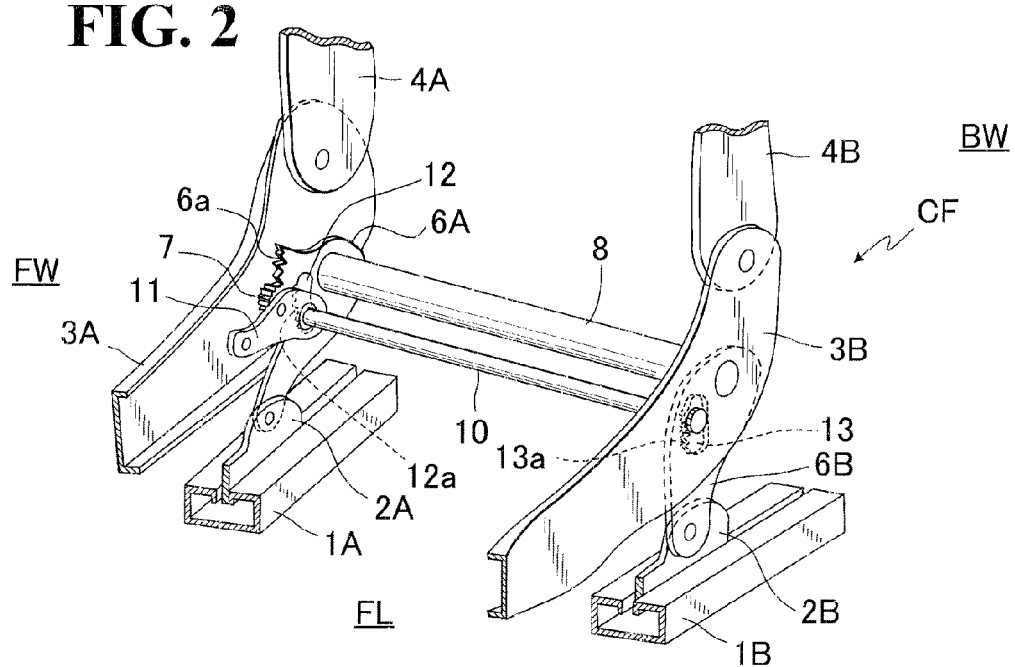
FIG. 2 is a partly broken perspective view showing a principal part of the seat in accordance with the invention.
Figure 3:
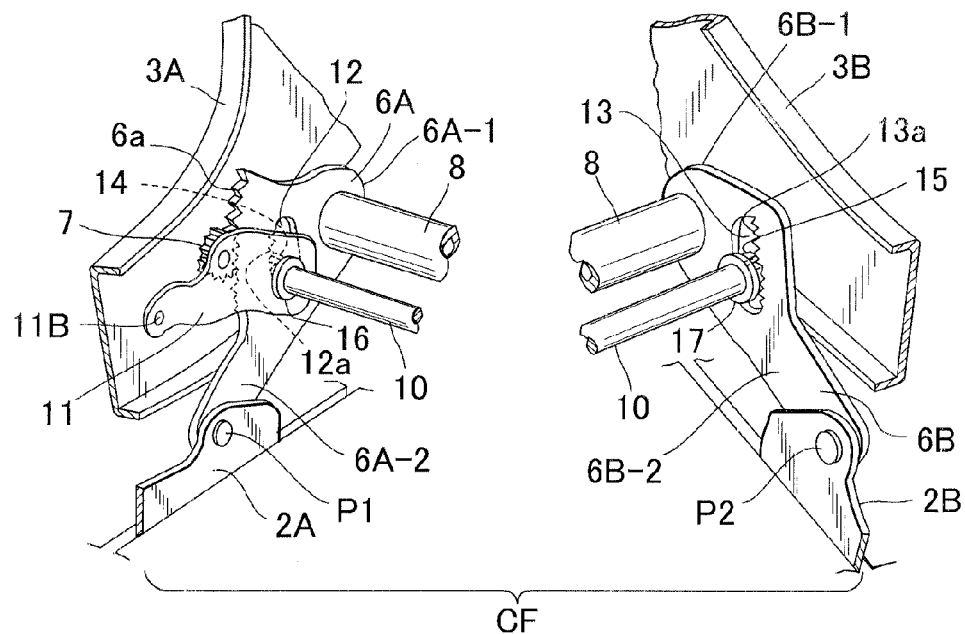
FIG. 3 is a partly broken and enlarged perspective view of the seat, which specifically showing one principal part provided to the left-side portion of the seat and another principal part provided to the right-side portion of the seat.
Figure 4:
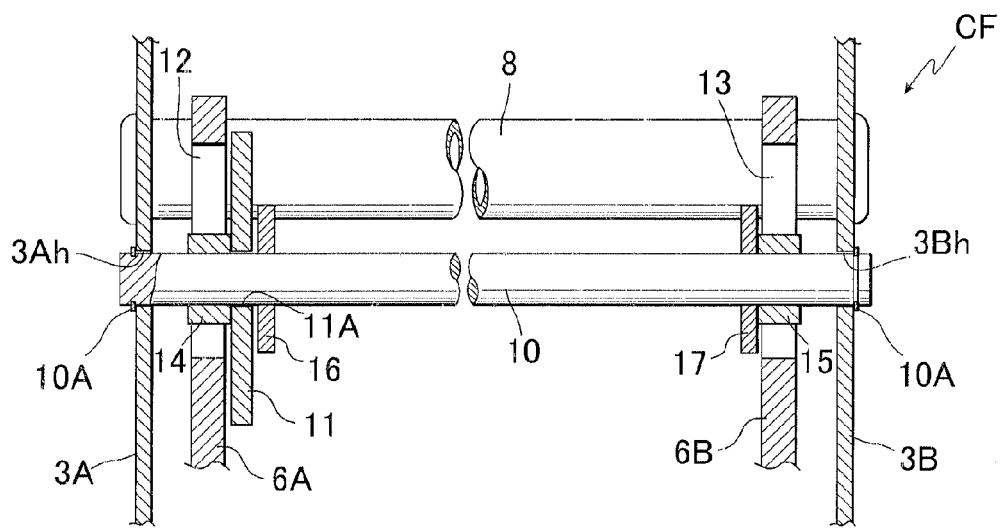
FIG. 4 is a partly broken fragmentary sectional view of the principal parts of the invention.

As seen in FIGS. 2 to 4, in accordance with the present invention, both left- and right-side rear links (6A) and (6B) are formed in the illustrated configuration substantially identical to each other, except that the left-side rear link (6A) has a sector gear portion (6a) defined therein.

Specifically, according to the shown embodiment, the right-side rear link (6B) is so formed to have: a lower end portion (6B-2) pivotally connected with the rearwardly facing end portion of the right-side upper rail (2B); and a widened upper portion (6B-1) diverging upwardly from the lower end portion (6B-2).

On the other hand, likewise, the left-side rear link (6A) is formed to have: a lower end portion (6A-2) pivotally connected with the rearwardly facing end portion of the left-side upper rail (2A); and a widened upper portion (6A-1) diverging upwardly from the lower end portion (6B-2). But, in this particular left-side rear link (6A), a sector gear portion (6a) is formed integrally in the forwardly facing edge region of the widened upper portion (6A-1).

As best seen in FIGS. 3 and 4, both two widened upper portions (6A-1) and (6B-1) respectively of the left- and right-side rear links (6A) and (6B) are rotatably connected with the left- and right-side lateral frame members (3A) and (3B), respectively, via a connecting rod (8). Connecting rod (8) is shown to be fixedly connected between the two lateral frame members (3A) (3B), so as to extend horizontally therebetween. In this regard, precisely stated, the left-side rear link's upper portion (6A-1) is, at its rearwardly facing end region, rotatably engaged on and about the left-side end portion of the connecting rod (8), as known in the art. Likewise, the right-side rear link's upper portion (6B-1) is, at its rearwardly facing end region, rotatably engaged on and about the right-side end portion of the connecting rod (8). In that way, the two upper portions (6A-1) (6B-1) respective of the left- and right-side rear links (6A) (6B) are pivotally connected with the seat cushion or the respective left- and right-side lateral frame members (3A) (3B).

The right-side rear link's upper portion (6B-1) further has an arcuate hole (13) formed in the forwardly facing end region thereof, the arcuate hole (13) basically extending in a direction vertically of the rear link (6B) as well as vertically of the seat cushion frame (CF). As shown, such arcuate hole (13) is situated at a point forward of the connecting rod (8) and extends along the circumference of a circle having its center at the central axis of the connecting rod (8). Designation (13a) denotes an inwardly-toothed arcuate gear portion defined integrally in and along the forwardly facing arcuate edge of the arcuate hole (13). Such gear portion (13a) naturally assumes an arcuate shape extending along a circle, the center of which is at the central axis of connecting rod (8).

Likewise, formed in the forwardly facing end region of the left-side rear link's upper portion (6A-1) is an arcuate hole (12) which also basically extends in a direction vertically of the rear link (6A) as well as vertically of the seat cushion frame (CF). The arcuate hole (12) is situated at a point forward of the connecting rod (8) and extends along the circumference of a circle having its center at the central axis of that connecting rod (8). Designation (12a) denotes an inwardly-toothed arcuate gear portion defined integrally in and along the forwardly facing arcuate edge of the arcuate hole (12). Such gear portion (13a) naturally assumes an arcuate shape extending along a circle, the center of which is at the central axis of connecting rod (8). Note that those arcuate hole (12) and gear portion (12a) are respectively identical in shape and size to the previously stated arcuate hole (13) and gear portion (13a) associated with the right-side rear link (6B).

It is also noted that the sector gear portion (6a) formed in the left-side rear link (6A) is situated forwardly of the afore-said arcuate hole (12), with the arcuate periphery of the sector gear portion (5a) extending along the circumference of a circle having its center at the central axis of the connecting rod (8). It is still further noted that the left- and right-side arcuate holes (12) and (13) are arranged so as to be in correspondence with each other, so that, during vertical synchronized displacement of both two rear links (6A) (6B), those two holes (12) (13) are synchronously displaced, while being maintained in alignment with each other.

Designation (7) denotes a drive pinion gear which is in meshed engagement with the sector gear portion (6a) stated previously. The drive pinion gear (7) has a support shaft (not designated) fixed in the center thereof. Although not clearly shown, one end of such support shaft is rotatably supported in the left-side lateral frame member (3A) and connected integrally with a drive shaft of a drive source (M), a part of seat lifter mechanism, whereas the other end of the support shaft is rotatably supported by a bracket (11) having a base end portion fixed by a pin (11B) to the left-side lateral frame member (3A). Thus, the drive pinion gear (7) is rotatably disposed between the lateral frame member (3A) and the bracket (11). In this respect, the drive source (M) may be an electric motor with reduction gear in the case of the seat lifter mechanism used being of a powered type, or alternatively be a manual handle having a brake device provided therewith in the case of the seat lifter mechanism used being of a manually operated type.

In accordance with the present invention, a reinforcing transmission shaft (10) is provided for the purpose of protecting the right-side rear links (6B) against deformation and insuring synchronized movement of both two rear links (6A) and (6B). Specifically, as seen from FIGS. 3 and 4, the reinforcing transmission shaft (10) has: a first pinion (14) fixed on and about the left-side end portion thereof; and a second pinion (15) fixed on and about the right-side end portion thereof. Briefly stated, the reinforcing transmission shaft (10) is rotatably journalled between the left- and right-side lateral frame members (3A) (3B) in a parallel relation with the connecting shaft (8), with the two end portions of that shaft (10) passing through the respective two arcuate holes (12) (13) respectively of the left- and right-side rear links (6A) (6B). In this regard, the first pinion (14) is meshed with the inwardly toothed gear portion (12a) formed in the arcuate hole (12), while the second pinion (15) is meshed with the inwardly toothed gear portion (13a) formed in the arcuate hole (13). As shown, it is important that the reinforcing transmission shaft (10) is disposed forwardly of the connecting rod (8) for the purpose of allowing a load (F) to be first applied to that reinforcing transmission shaft (10) and dispersed therethrough to the seat cushion frame, as will be described later.

Referring particularly to FIG. 4 in conjunction with FIG. 3, the left-side end portion of the reinforcing transmission shaft (10) is also rotatably received in a bearing hole (11A) formed in the bracket (11), Hence, the bracket (11) is supported by the following two points: the pin (11B) and the reinforcing transmission shaft (10), which advantageously disperses a part of load (F) applied to the drive pinion (7), as will be described later.

Further, as best seen in FIG. 4, one distal end region of the reinforcing transmission shaft (10) is rotatably received in a bearing hole (3Ah) formed in the left-side lateral frame member (3A) and retained by a securing ring (10A) against removal therefrom. The other distal end region of reinforcing transmission shaft (10) is likewise rotatably received in another bearing hoe (3Bh) formed in the right-side lateral frame member (3B) and retained by a securing ring (10A) against removal therefrom.

The reinforcing transmission shaft (10) has a pair of left- and right-side detent rings (16) and (17) fixed thereon, which are adapted for preventing the shaft (10) against lateral dislocation in a direction along the longitudinal axis thereof. As depicted in both FIGS. 3 and 4, the left-side detent ring (16) is fixed on and about the left-side end portion of the shaft (10) so as to slightly contact the surface of the bracket (11), whereas the right-side detent ring (17) is fixed on and about the right-side end portion of the shaft (10) so as to slightly contact the inward wall of the right-side rear link (6B). With such arrangement, the reinforcing transmission shaft (10) is positively prevented against dislocation in any of left and right directions along the longitudinal axis thereof.

As constructed above, looking at FIG. 3, when a seat occupant operates the drive sources (M) to raise the seat (S) for instance, the drive pinion (7) is rotated clockwise, the sector gear portion (6a) meshed with that drive pinion (7) is rotated anticlockwise relative to the connecting shaft (8), which in turn causes the left-side rear link (6A) per se to rotate forwardly and upwardly relative to the lower pivot point (P1). At this moment, both of the following actions are simultaneously effected:

(i) the afore-said forward and upward rotation of left-side rear link (6A) is simultaneously transmitted via the connecting rod (8) to the right-side rear link (6B), thereby causing synchronized forward and upward rotation of the two rear links (6A) and (6B) relative to the receptive two lower pivot points (P1) and (P2); and (ii) simultaneous therewith, the inwardly toothed gear portion (12a) formed in the left-side rear link (6A) is rotatively displaced anticlockwise relative to the connecting shaft (8), thereby causing simultaneous anticlockwise rotation of the first pinion (14) meshed with that gear portion (12a). With the anticlockwise rotation of first pinion (14), the reinforcing transmission shaft (10) is simultaneously rotated in the likewise anticlockwise direction, so that the anticlockwise rotation of first pinion (14) is transmitted via the reinforcing transmission shaft (10) to the second pinion (15) which is therefore simultaneously rotated anticlockwise, whereupon the inwardly toothed gear portion (13a) meshed with that second pinion (15) is rotatively displaced anticlockwise relative to the connecting rod (8), which in turn causes the right-side rear link (6B) per se to rotate forwardly and upwardly relative to the lower pivot point (P2) in synchronism with the lift-side rear link (6A) being rotated in the likewise forward and upward directions relative to the lower pivot point (P1).

Of course, both two front links (5A) (5B) are also simultaneously rotated forwardly and upwardly in synchronism with the above-described two rear links (6A) (6B), since those four links assume a parallel linkage structure as stated previously.

Accordingly, with the foregoing movement of all the links (5A, 5B, 6A and 6B), the seat (S) is displaced upwardly away from the slide rail device (SL) or floor (FL). When the seat occupant stops operation of the drive source (M), all the four links (5A, 5B, 6A, and 6B) are stopped and positioned at a given angle of inclination relative to the seat slide devices (SL) or floor (FL), so that the seat (S) is set to a desired level. At this time, those four links are retained against movement by a brake effect which may be given by a reduction gear of electric motor in the case of the electric motor being employed as the drive source (M), or by a brake unit provided in a manual handle in the case of the manual handle being employed as the drive source (M). If it is desired to lower the seat (S), in brief, the drive source (M) may be operated reversely to cause anticlockwise rotation of the drive pinion (7) for clockwise rotative displacement of the sector gear portion (6a) and also for clockwise synchronized rotative displacement of the two inwardly toothed gear portions (12a) (13a) via the reinforcing transmission shaft (10), thereby causing backward and downward movement of all the four links (5A, 5B, 6A and 6B), so that the seat (S) may be adjustingly lowered to a desired level.

It is noted that the entire length of both two arcuate holes (12) (13) defines the range and limit of vertical displacement of both two rear links (6A) (6B) and thus serves as a stopper for preventing the two rear links (6A) (6B) against excessive vertical displacement. Namely, for example, suppose that the drive source (M) is operated to cause upward displacement of the links (6A) (6B) to raise the seat (S). In that instance, if a seat occupant continues on operating the drive source (M), the two arcuate holes (12) (13) are rotatively displaced downwardly to the extent that the two upper edges respectively of the two arcuate holes (12) (13) are brought to contact with the respective two pinions (14) (15), as a result of which, the operation of the drive source (M) is forcibly blocked, whereby the rear links (6A) (6B) are forcibly prevented against further upward displacement. Reversely, if the seat occupant continues operation of the drive source (M) to cause downward displacement of the links (6A) (6B) to lower the seat (S), the two lower edges respective of the two arcuate holes (12) (13) come to contact with the respective two pinions (14) (15), thereby forcibly blocking the operation of drive source (M) and thus preventing further downward displacement of the rear links (6A) (6B).

By virtue of the above-described arrangement and structure, it is to be appreciated that, when a rear-end collision occurs, with an excess great load (F) (see FIG. 1) being applied backwardly and downwardly form a seat occupant (not shown) under inertia to the seat cushion frame (CF), most of the load (F) is intensively exerted upon the reinforcing transmission shaft (10) prior to being applied to the connecting rod (8) and both two rear links (6A) (6B). Thus, the load (F) is transmitted through that reinforcing transmission shaft (10) equally to each of the left- and right-side lateral frame members (3A) (3B) and dispersed therein, without being directly applied to the two rear links (6A) (6B). With such arrangement, the excessive great load (F) is not directly applied to the right-side rear link (6B) which is not robust structurally in comparison with the left-side rear link (BA), thereby insuring to protect the relatively weak rear link (6B) against deformation, and therefore solving such conventional problems as undesired lowering of the seat or inclination of one lateral side of the seat which are caused by deformation of one relatively brittle rear link in the case of rear-end collision.

Also, it is to be appreciated that, in addition to being synchronously displaceable via the connecting rod (8), both two rear links (6A) (6B) are assisted by the combination of pinions (14 and 15) and inwardly toothed gear portions (12a and 13b) as well as the reinforcing transmission shaft (10) to insure synchronized vertical displacement of the two rear links (6A and 68). Moreover, the meshed engagement of two pinions (14 and 15) with the respective two gear portions (12a and 13a) in effect establishes a great robust structure in cooperation with the reinforcing transmission shaft (10), which provides a stable passage through which the load (F) is to be smoothly and equally transmitted to and dispersed in each of the left- and right-side lateral frame members (3A) and (3B). Consequently, the two rear links (6A and 6B) are not damaged by the excessive great load (F) in the case of rear-end collision, and that, even if a slight deformation and distortion is caused in and/or between the seat cushion frame (CF) and connecting rod (8) due to the excessive great load (F), the meshed engagement of the two pinions (14 and 15) with the respective two gear portions (12a and 13b) is still maintained, thus insuring to allow both two rear links (6A and 6B) to be moved together in a synchronized manner, without being influenced by the rear-end collision.

Additionally, by virtue of such meshed engagement of pinions (14 and 15) with the respective gear portions (12a and 13a) and the reinforcing transmission shaft (10), the brake effect stated previously, which is normally given by the drive source (M), such as a reduction gear of electric motor used as the drive source or a brake unit provided in a manual handle used as the drive source, is also transmitted through the pinions (14 and 15), gear portions (12a and 13a) and reinforcing transmission shaft (10) in a direction from the left-side rear link (6A) to the right-side rear link (6B). Hence, the brake effect is equally given to both of the two rear links (6A and 6B), which effectively insures stable automatic stoppage of those two particular rear links (5A and 6B) at the same time, every time a seat occupant stops operation of the drive source (M). Accordingly, in accordance with the present invention, the right-side rear link (6B), which is not so robust relative to the left-side rear link (6A), is protected against deformation in the case of rear-end collision, while insuring a smooth synchronized displacement of both two rear links (6A and 6B). It is therefore materially possible to prevent lowering of the seat or inclination of one side of the seat which is caused by the rear-end collision as found in the conventional vehicle seats.

While having described the present invention thus far, it is to be understood that the invention is not limited to the illustrated embodiment, but any modification, addition and replacement may be applied thereto, without departing from the scopes of the appended claims.

What is claimed is:

1. A seat to be mounted in a vehicle, comprising:
    a seat cushion frame including a first frame member and a second frame member;
    a drive pinion rotatably supported in said first frame member of said seat cushion frame, said drive pinion being operatively connected with a drive source provided with the seat;
    a first link element having: an upper portion pivotally connected with said first frame member of said seat cushion frame; and a lower portion pivotally connected with a floor of said vehicle, wherein said upper portion has, defined therein, a first sector gear portion which is in meshed engagement with said drive pinion;
    said first link element including a hole and a second gear portion;
    a second link element having: an upper portion pivotally connected with said second frame member of said seat cushion frame; and a lower portion pivotally connected with said floor of said vehicle;
    said second link element including a hole and a third gear portion;
    a connecting axis element rotatably extended between said first and second frame members of said seat cushion frame;
    said first and second link elements being coupled together by said connecting axis element for synchronized movement;
    a reinforcing transmission shaft having one end portion and another end portion, said reinforcing transmission shaft extending in a parallel relation with said connecting axis element, such that said end portion thereof extends through said hole of said first link element and is rotatably connected with said first frame member of said seat cushion frame, whereas said another end portion thereof extends through said hole of said second link element and is rotatably connected with said second frame member of said seat cushion frame;
    a first pinion fixed to said one end portion of said reinforcing transmission shaft, said first pinion being in meshed engagement with said second gear portion of said first link element; and
    a second pinion fixed to said another end portion of said reinforcing transmission shaft, said second pinion being in meshed engagement with said third gear portion of said second link element.

2. The seat as claimed in claim 1, which includes a slide rail device comprising a pair of lower rails fixed on said floor of said vehicle and a pair of upper rails slidably engaged with said pair of lower rails, respectively, wherein said lower portion of said first link element is pivotally connected with one of said pair of upper rails, while said lower portion of said second link element is pivotally connected with the other of said pair of upper rails.

3. The seat as claimed in claim 1, wherein said first link element comprises a first front link and a first rear link, wherein said first frame member has a forwardly facing portion and a rearwardly facing portion, wherein said first front link is pivotally connected with a forwardly facing portion of said first frame member, whereas said first rear link is pivotally connected with a rearwardly facing portion of the first frame member, wherein said second link element comprises a second front link and a second rear link, wherein said second frame member has a forwardly facing portion and a rearwardly facing portion, wherein said second front link is pivotally connected with a forwardly facing portion of said second frame member, whereas said second rear link is pivotally connected with a rearwardly facing portion of the first frame member, wherein said first sector gear portion is formed in an upper portion of said first rear link, said upper portion corresponding to said upper portion of said first link element, wherein said hole and said second gear portion associated with said first link element are formed in said first rear link, wherein said hole and said third gear portion associated with said second link element are formed in said second rear link, and wherein said reinforcing transmission shaft is arranged between said first and second rear links in such a manner that said one and another end portions of the reinforcing transmission shaft extend through the respective said holes of said first and second rear links, with said first and second pinions being in meshed engagement with said second and third gear portions respectively of said first and second rear links.

4. The seat as claimed in claim 1, wherein said hole of said first link element is so formed as to extend in a direction vertically of the seat, and wherein said second gear portion of said first link element is formed in one edge portion of said hole, thus defining an inwardly-toothed gear portion in said first link element.

5. The seat as claimed in claim 2, wherein said hole of said first rear link is so formed as to extend in a direction vertically of the seat, wherein said second gear portion of said first rear link is formed in one edge portion of said hole, thus defining an inwardly-toothed gear portion in said first rear link, wherein said hole of said second rear link is so formed as to extend in a direction vertically of the seat, and wherein said third gear portion of said second rear link is formed in one edge portion of said hole, thus defining an inwardly-toothed gear portion in said second rear link.

* * * * *